United States Patent
Ando et al.

(10) Patent No.: US 7,892,682 B2
(45) Date of Patent: Feb. 22, 2011

(54) FUEL CELL SYSTEM AND METHOD FOR CONTROLLING AIR-FLOW RATE THEREIN

(75) Inventors: Akiji Ando, Saitama (JP); Hideo Numata, Saitama (JP); Yuji Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 289 days.

(21) Appl. No.: 12/129,136

(22) Filed: May 29, 2008

(65) Prior Publication Data
US 2008/0299426 A1      Dec. 4, 2008

(30) Foreign Application Priority Data
May 31, 2007   (JP)   ............... 2007-144517

(51) Int. Cl.
*H01M 8/04*   (2006.01)
(52) U.S. Cl. .................. 429/428; 429/427; 429/444
(58) Field of Classification Search .............. 429/22, 429/13, 57, 26, 24, 30, 34, 427, 428
See application file for complete search history.

(56) References Cited

U.S. PATENT DOCUMENTS

2005/0118471 A1*   6/2005   Fukuma et al. ............... 429/22
2006/0216555 A1*   9/2006   Shige et al. ............... 429/19

FOREIGN PATENT DOCUMENTS

| JP | 2005-011654 | 1/2005 |
| JP | 2006-147213 | 6/2006 |
| JP | 2006-155927 | 6/2006 |

* cited by examiner

*Primary Examiner*—Jonathan Crepeau
*Assistant Examiner*—Kenneth Douyette
(74) *Attorney, Agent, or Firm*—Nelson Mullins Riley & Scarborough, LLP; Anthony A. Laurentano

(57) ABSTRACT

A fuel cell system includes: a fuel cell for generating electricity using a chemical reaction between hydrogen and air supplied thereto; a diluter for diluting hydrogen discharged from the fuel cell with air discharged from the fuel cell; a request load air amount calculation unit for calculating an amount of air required for generating electricity in the fuel cell which meets request load; a dilution air amount calculation unit for calculating an amount of air to be supplied to the fuel cell that provides an amount of discharged gas required for diluting hydrogen in the diluter to a specific concentration; and an air supply control unit for supplying air to the fuel cell in an amount which is the larger amount selected from between the amount of air calculated in the request load air amount calculation unit and the amount of air calculated in the dilution air amount calculation unit.

4 Claims, 10 Drawing Sheets hydrogen purge control

FUEL CELL SYSTEM AND METHOD FOR CONTROLLING AIR-FLOW RATE THEREIN

CROSS-REFERENCE TO RELATED APPLICATIONS

This application claims the foreign priority benefit under Title 35, United States Code, section 119 (a)-(d), of Japanese Patent Application No. 2007-144517, filed on May 31, 2007 in the Japan Patent Office, the disclosure of which is herein incorporated by reference in its entirety.

BACKGROUND OF THE INVENTION

1. Field of the Invention

The present invention relates to a fuel cell system for supplying a current to a load by generating electricity using a chemical reaction between hydrogen and oxygen, and a method for controlling air-flow rate therein.

2. Description of the Related Art

Fuel cells, which have been widely used in various fields including vehicles (e.g., automobiles), domestic applications and industrial applications, generate electricity using a chemical reaction between hydrogen and oxygen. Therefore, when load of the fuel cell becomes higher, an amount of hydrogen discharged by purging, draining or the like during an operation of the fuel cell becomes larger, so does a flow rate of air containing oxygen to be reacted with hydrogen.

FIG. 9A is a graph showing a relationship between load and air-flow rate in a fuel cell, in which the abscissa shows the load of the fuel cell and the ordinate shows the flow rate of air supplied to the fuel cell. FIG. 9B is a graph showing a relationship between load of a fuel cell and amount of hydrogen discharged from the fuel cell, in which the abscissa shows load of the fuel cell and the ordinate shows amount of hydrogen discharged.

Conventionally, when the air-flow rate is small under low load (see FIG. 9A), the amount of air for dilution is controlled in accordance with a set range h, which is a hydrogen discharge amount per purge operation under high load (see FIG. 9B), in order to suppress a raise in the hydrogen concentration.

Alternatively, the volume of the diluter configured to store discharged hydrogen is made larger to some extent so that the diluter can temporally store a larger amount of the discharged hydrogen in order to prevent the hydrogen concentration from increasing when the load is reduced and to suppress the hydrogen concentration to a specific low concentration.

For example, since the diluter into which hydrogen containing impurities is to be discharged is exclusively filled with air before purging of such hydrogen, the concentration of the hydrogen to be exhausted can be reduced by making the volume of the diluter (space for storing hydrogen) large.

FIG. 10 is a schematic cross section showing a configuration of a conventional diluter 101 and vicinities thereof.

As shown in FIG. 10, into a hollow space of a diluter 101, hydrogen discharged from the fuel cell (hereinafter, frequently and simply referred to as "discharged hydrogen") flows from a hydrogen discharge piping 102 through an opened purge valve or drain valve, as indicated with an arrow c. By air flowing through an air discharge piping 103 as indicated with an arrow a which is to be exhausted out of the vehicle (hereinafter, frequently and simply referred to as "discharged air"), the discharged hydrogen in the diluter 101 is sucked from a hydrogen outlet 103d formed in the air discharge piping 103 as indicated with an arrow A, and then exhausted out of the vehicle together with the discharged air, as indicated with an arrow b. The expelling of the discharged hydrogen in the diluter 101 from the hydrogen outlet 103d to the air discharge piping 103 is facilitated by air for diluting and pushing out, which is introduced from a bypass piping 104 as indicated with an arrow d (see JP2006-155927A, especially paragraphs 0028-0033, 0042, 0044, and FIGS. 1 and 2).

As described above, by making the volume of the diluter 101 larger, the concentration of the total discharged hydrogen in the diluter 101 that has flown thereinto becomes lower, and thus the amount per unit time of the discharged hydrogen can be lowered (equalized) at the hydrogen outlet 103d where the discharged hydrogen is mixed with the discharged air (see FIG. 10). With this configuration, a raise in the discharged hydrogen concentration in the air discharge piping 103 can be suppressed, even when the flow rate of the discharged air in the air discharge piping 103 decreases.

On the other hand, in JP2005-11654A, there is disclosed a fuel cell system with a diluter for diluting hydrogen to be exhausted, in which a dilution gas supply passage for introducing discharged air from a fuel cell to the diluter is branched from a discharged oxygen-containing gas exhausting passage on which a pressure-regulating valve is provided, and an opening degree of the regulating valve is reduced to increase the amount of the discharged oxygen-containing gas to be introduced to the dilution gas supply passage when the amount of the discharged oxygen-containing gas is low (see paragraphs 0007 and 0010, FIGS. 1 and 2 and the like).

Meanwhile, in JP2006-155927A, the amount of the discharged hydrogen is reduced by reducing an opening period of the purge valve (i.e., reducing a purge amount per purge operation), while increase and decrease of the air-flow rate caused by change in the load of the fuel cell are taken into consideration. In addition, setting is made in such a manner that a raise in the concentration of the discharged hydrogen is suppressed when the amount of the discharged air is small. However in this case, a purge effect per purge operation becomes small, and as a result, an amount of hydrogen efficiently used for electricity generation becomes low, leading to a problem of increase in the hydrogen discharge amount.

Further, in the case where an increase in the hydrogen concentration is suppressed by making the diluter 101 for storing the discharged hydrogen larger, the weight of the diluter 101 becomes larger, the fuel economy becomes lower, and the material cost for the diluter 101 becomes higher, leading to a problem of the higher cost.

On the other hand, in JP2005-11654A, when the amount of air discharged from the fuel cell is small, the air amount more than the amount of the discharged air cannot be introduced to the diluter, no matter how the opening degree of the regulating valve is controlled. This leads to a problem that, for example, in the case where hydrogen is discharged under high load and then the load becomes low in a short period of time, difficulty arises in securing an amount of air required for diluting a large amount of hydrogen discharged under high load As described above, when the load of the fuel cell rapidly decreases from a high level to a low level, the discharged air amount decreases in a shorter period of time, relative to a time period from immediately after purging hydrogen under high load to discharging hydrogen out of the system under the decreased load. As a result, there arises a problem that the hydrogen concentration may increase above an allowable range, due to this time lag.

Therefore, it would be desirable to provide a fuel cell system which is capable of appropriately controlling the air-flow rate in accordance with the amount of the discharged hydrogen, and controlling the hydrogen concentration in gas discharged from the system to be retained in an allowable range. It is also desirable to provide a method for controlling the air-flow rate as such.

SUMMARY OF THE INVENTION

In one aspect of the present invention, there is provided a fuel system including: a fuel cell configured to generate electricity using a chemical reaction between hydrogen and air supplied thereto; a diluter configured to dilute hydrogen discharged from the fuel cell with air discharged from the fuel cell; a request load air amount calculation unit configured to calculate an amount of air required for generating electricity in the fuel cell which meets request load; a dilution air amount calculation unit configured to calculate an amount of air to be supplied to the fuel cell that provides an amount of discharged gas required for diluting hydrogen in the diluter to a specific concentration; and an air supply control unit configured to supply air to the fuel cell in an amount which is the larger amount of air selected from between the amount of air calculated in the request load air amount calculation unit and the amount of air calculated in the dilution air amount calculation unit.

In another aspect of the present invention, there is provided a method for controlling air-flow rate in a fuel cell system including: an electricity generation step in which hydrogen and air are supplied to a fuel cell for allowing a chemical reaction between the supplied hydrogen and air to generate electricity; a hydrogen dilution step in which hydrogen in a diluter discharged from the fuel cell is diluted with air discharged from the fuel cell; a request load air amount calculation step in which an amount of air required for generating electricity in the fuel cell which meets request load is calculated; a dilution air amount calculation step in which an amount of air to be supplied to the fuel cell that provides an amount of discharged gas required for diluting hydrogen discharged from the fuel cell to a specific concentration is calculated; and an air supply step in which the larger amount of air selected from between the amount of air calculated at the request load air amount calculation step and the amount of air calculated at the dilution air amount calculation step is supplied to the fuel cell.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

An embodiment of the present invention will be described in detail below with reference to the accompanying drawings.

<<Schematic Configuration of Fuel Cell System 1>>

Figure 1:
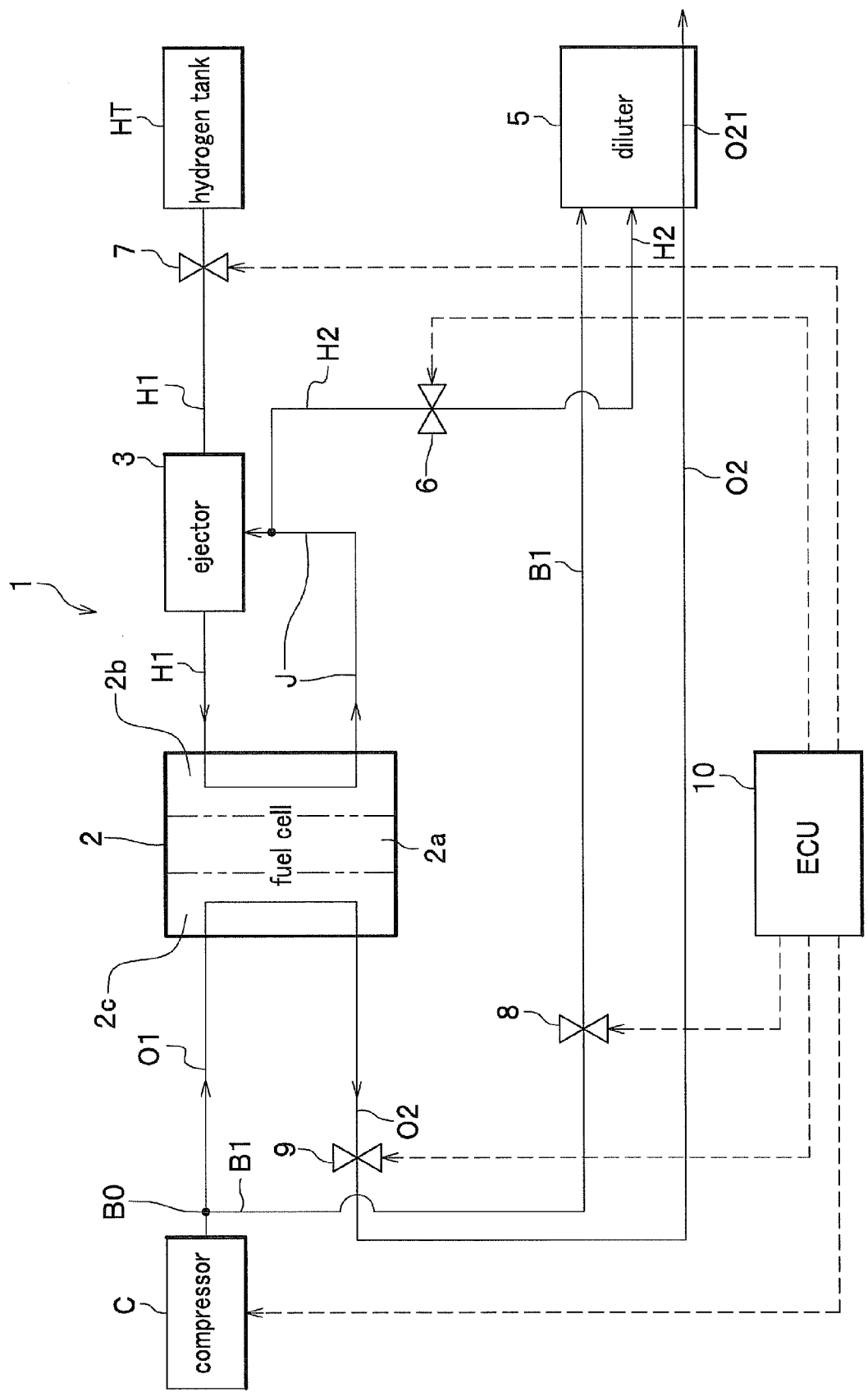
FIG. 1 is a configurational diagram showing a fuel cell system according to an embodiment of the present invention.

FIG. 1 is a configurational diagram showing a fuel cell system 1 according to an embodiment of the present invention.

As shown in FIG. 1, a fuel cell 2 in the fuel cell system 1 according to the present invention is configured to be mounted on a vehicle (not shown), in which hydrogen as fuel gas in a hydrogen tank HT is supplied to an anode electrode 2b through hydrogen supply piping H1, and air is supplied from a compressor (air supply control unit) C to a cathode electrode 2c through air supply piping O1, electricity is generated using an electrochemical reaction between hydrogen and oxygen as oxidant gas contained in the air, and current is output to loads, such as a driving motor (not shown).

The supplied hydrogen and oxygen are consumed through the electric generation in the fuel cell 2, and the hydrogen and oxygen unused in the electric generation are discharged from the fuel cell 2 as-is. In order to improve the fuel consumption and the like, hydrogen discharged from the fuel cell 2 is recycled through circulation piping J to the hydrogen supply piping H1 at an ejector 3 immediately before the fuel cell 2.

It should be noted that various components, such as: a catch tank disposed on the circulation piping J for condensing and storing water vapor contained in hot hydrogen discharged from the fuel cell 2; a drain valve for discharging water in the catch tank; and a humidifier disposed on the air supply piping O1 or the like, for humidifying supplied air to the fuel cell 2, are omitted for convenience of simplification.

The fuel cell 2 has a serially-laminated cell structure made of a plurality of (e.g. 200) membrane electrode assemblies (MEA) and conductive separators (not shown) sandwiching MEA, each of which MEA is formed by sandwiching a solid polymer electrolyte membrane 2a having ion conductive property between the anode electrode 2b containing catalyst and the cathode electrode 2c containing catalyst. On each of the separators are formed hydrogen flow path, air flow path and cooling water path, for supplying hydrogen, air and water from a cooling water circulation device (not shown), respectively, without mixing them.

On the hydrogen supply piping H1 between the hydrogen tank HT as a fuel gas source and the ejector 3, there is disposed a shutoff valve 7 configured to control supply of hydrogen from the hydrogen tank HT, by opening and closing the valve. To the circulation piping J, hydrogen discharge piping H2 is connected which is configured to discharge highly-concentrated hydrogen to a diluter 5 during a hydrogen purge control (which will be described later). On the hydrogen discharge piping H2, a hydrogen purge valve 6 is disposed whose opening and closing are controllable.

<<Detailed Configuration of Fuel Cell System 1 and Dilution of Hydrogen Discharged from Fuel Cell System 1>>

If impurities, such as nitrogen and residual water, are present in the fuel cell 2 upon the electric generation by the fuel cell 2, a chemical reaction for the electric generation is hindered and generating efficiency is reduced. In addition, there are some cases where the electric-generating capacity becomes low during an operation of the fuel cell 2, and the cause is believed to be impurities, such as nitrogen and residual water, in the fuel cell 2.

Therefore, before the fuel cell 2 generates electricity or when the electric-generating capacity of the fuel cell 2 becomes low, a hydrogen purge control is performed in which hydrogen is supplied to an anode electrode 2b side of the fuel cell 2 to thereby remove the impurities together with the supplied hydrogen. During the hydrogen purge control, the hydrogen purge valve 6 connected to the hydrogen discharge piping H2 leading to the circulation piping J is opened, and as shown in FIG. 2, impurities are discharged together with hydrogen through the hydrogen discharge piping H2 to the diluter 5, which is external to the electricity generation system.

At this time, highly-concentrated hydrogen is discharged into the diluter 5 together with impurities. Hereinafter, this hydrogen discharged into the diluter 5 may be referred to as "discharged hydrogen". As will be described later, this discharged hydrogen having a high concentration is then diluted, in the diluter 5 and an air discharge piping O2 after the diluter 5, to a low concentration which is suitable to be exhausted out of the vehicle, and exhausted out of the vehicle as such.

On the other hand, air compressed by the compressor C is separated by branched piping B0, such as T-shaped junction, into air for generating electricity supplied to a cathode electrode 2c side of the fuel cell 2 through the air supply piping O1 and air for diluting hydrogen introduced to the diluter 5 through a bypass piping (bypass channel) B1. It should be noted that, air for diluting hydrogen introduced to the diluter 5 through the bypass piping B1 has a function of diluting highly-concentrated hydrogen discharged into the diluter 5 to low concentration, as well as a function of pushing hydrogen out of the vehicle.

Figure 2:
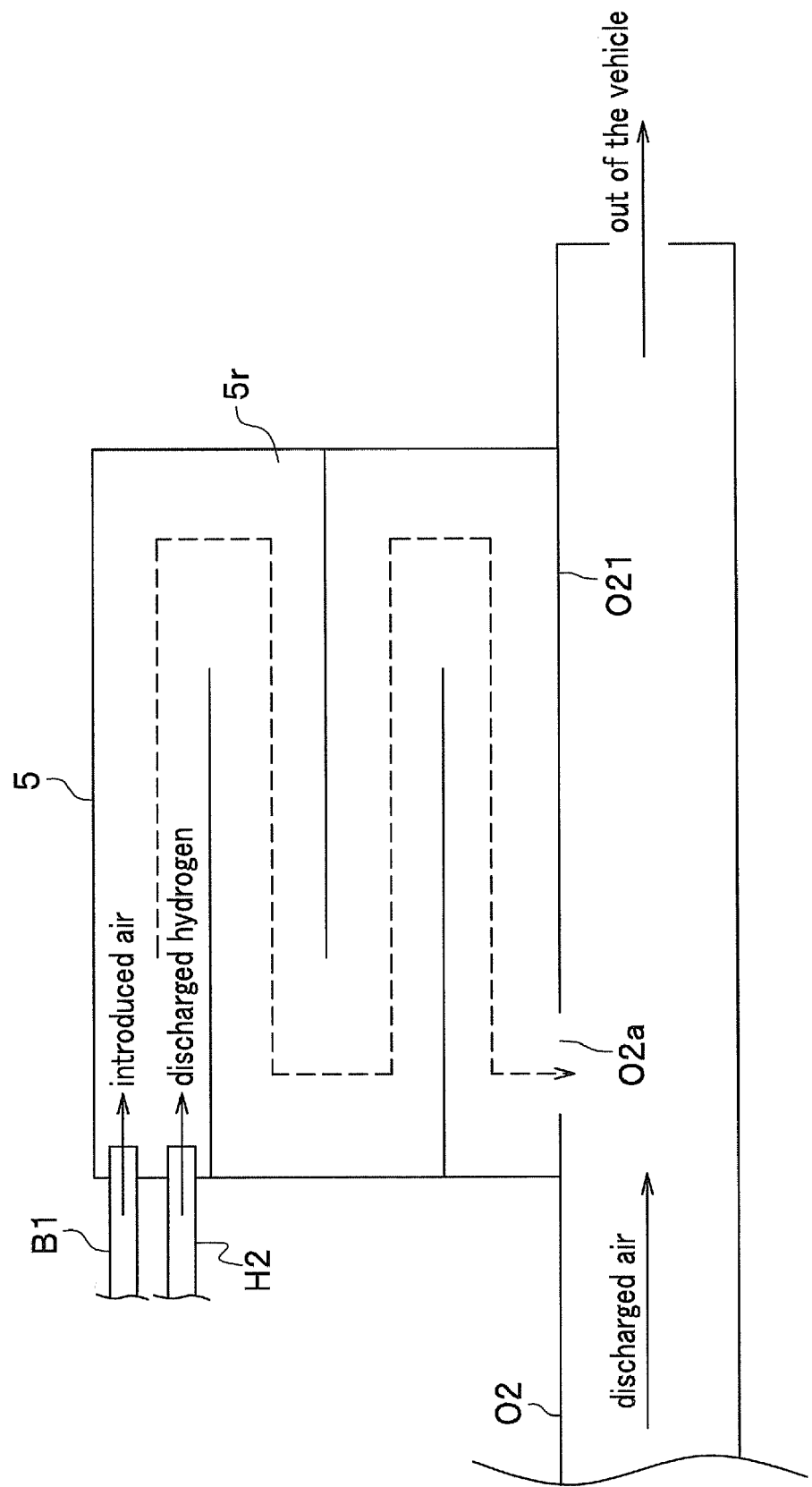
FIG. 2 is a schematic cross section showing a diluter according to an embodiment of the present invention and air discharge piping in the vicinity of the diluter.

FIG. 2 is a schematic cross section showing the diluter 5 and piping in the vicinity thereof.

As shown in FIGS. 1 and 2, air for diluting hydrogen sent to the diluter 5 through the bypass piping B1 dilutes, in the diluter 5, highly-concentrated hydrogen discharged thereinto through the hydrogen discharge piping H2, and at the same time, pushes out the diluted discharged hydrogen from a hydrogen outlet O2a (which will be described later). On the bypass piping B1, a dilution valve 8 whose opening and closing are controllable is disposed. Hereinafter, the air for diluting hydrogen from the bypass piping B1 to the diluter 5 may be simply referred to as "introduced air".

The air supplied to the cathode electrode 2c side of the fuel cell 2 through the air supply piping O1 is used in each cell of the fuel cell 2 for generating electricity. The remaining air which passed the cells but not used for the electricity generation is discharged from the fuel cell 2 and flows through the air discharge piping O2, to be exhausted out of the vehicle as shown in FIG. 2, after passing a silencer (not shown). It should be noted that on the air discharge piping O2, there is disposed a backpressure valve 9. Hereinafter, the air discharged from the cathode electrode 2c side of the fuel cell 2 may be referred to as "discharged air".

As shown in FIG. 1, the discharged air from the cathode electrode 2c of the fuel cell 2 flows through the air discharge piping O2, and as shown in FIG. 2, sucks the diluted discharged hydrogen in the diluter 5 from the hydrogen outlet O2a formed in the air discharge piping O2 that communicates with a space in the diluter 5, further dilutes the sucked discharged hydrogen to a lower concentration and then is exhausted together with the discharged hydrogen out of the vehicle through the silencer. The air discharge piping O2 is installed in such a manner that it penetrates through the diluter 5, and in a penetrating portion (air discharge inserted piping O21) thereof, the hydrogen outlet O2a is formed as described above. It should be noted that, the air discharge piping O2 may not penetrate through the diluter 5 and instead it may be disposed adjacent to the diluter 5, at the portion around the hydrogen outlet O2a.

As shown in FIG. 2, a dilution channel 5r is formed in the diluter 5, and highly-concentrated hydrogen discharged into the diluter 5 through the hydrogen discharge piping H2 upon the hydrogen purge control is diluted to a lower concentration with the introduced air to the diluter 5 from the bypass piping B1 while flowing through the channel 5r as indicated with a dashed arrow, and at the same time, is pushed to the hydrogen outlet O2a.

It should be noted that the above-mentioned devices or units of the fuel cell system 1 is under overall control by a controller (a request load air amount calculation unit, a dilution air amount calculation unit and an air supply control unit) 10.

<<Generation of Undiluted Hydrogen>>

Next, descriptions are made in a case where undiluted hydrogen exhausted out of the vehicle has a concentration above an appropriate concentration, which is a conventional problem.

Herein, the expression "normal air-flow rate" means a discharged gas-flow rate passing through the air discharge inserted piping O21 in the diluter 5 (see FIG. 2), or a flow rate of the discharged air from the fuel cell 2 without being used in the electricity generation, in the case where air is supplied to the fuel cell 2 in an amount based on (or proportional to) the amount of the electricity generation by the fuel cell 2. The expression "required air-flow rate" means a discharged gas-flow rate in the air discharge inserted piping O21 (see FIG. 2), or a flow rate of the discharged air which is required for diluting the discharged hydrogen in the diluter 5 to an appropriate concentration in accordance with the concentration thereof in the diluter 5, and for exhausting the diluted hydrogen out of the vehicle.

Figure 3:
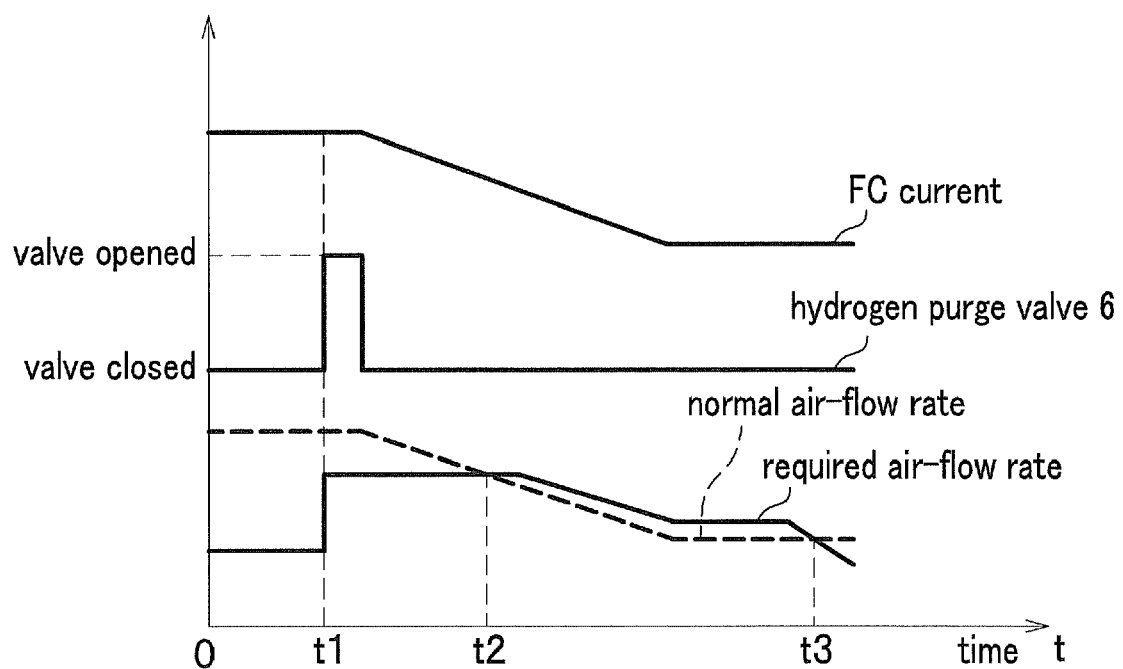
FIG. 3 is a graph showing changes over time regarding: current generated in a fuel cell; operations of opening or closing of a hydrogen purge valve; flow rate of discharged air flowing a portion of air discharge piping located in the diluter; flow rate of required air flowing a portion of the air discharge piping located in the diluter, obtained based on a discharged hydrogen concentration in the diluter, according to an embodiment of the present invention.

FIG. 3 is a graph in the case where load becomes low in a short period of time after purging hydrogen under the fuel cell 2 being high load, showing changes over time regarding: current generated in the fuel cell 2 (in FIG. 3, simply indicated as "FC current"); operations of opening or closing of the hydrogen purge valve 6; normal air-flow rate in the air discharge inserted piping O21 (see FIG. 2); and required air-flow rate in the air discharge inserted piping O21 (see FIG. 2). In the graph, the abscissa shows time t, while the ordinate shows FC current, opening/closing operations of the hydrogen purge valve 6, the normal air-flow rate and the required air-flow rate.

As shown in FIG. 3, initially the fuel cell 2 of high load generates electricity. Immediately after the hydrogen purge valve 6 is opened (at a time t1 in FIG. 3), the load becomes lower in a short period of time, and thus an amount of the generated electricity is reduced in a short period of time. Since air is supplied from the compressor C in an amount proportional to an amount of the electricity generation in the fuel cell 2, as the FC current decreases after the time t1 in FIG. 3, the rotation of the compressor C is controlled to become lower by the controller 10, leading to a reduction of the normal air-flow rate along with the decrease in the FC current.

On the other hand, the flow rate of the required air passing the air discharge inserted piping O21 for appropriately diluting the discharged hydrogen in the diluter 5 to the appropriate concentration in accordance with the concentration thereof and exhausting out of the vehicle rapidly increases after the time t1 in FIG. 3, because the hydrogen purge valve 6 is opened (at the time t1 in FIG. 3) and the discharged hydrogen is rapidly introduced to the diluter 5.

When the elapsed time reaches a time t2 in FIG. 3, the required air-flow rate in accordance with the discharged hydrogen concentration in the diluter 5 exceeds the normal air-flow rate. In other words, the discharged air with a flow rate smaller than the discharged air-flow rate corresponding to the discharged hydrogen concentration in the diluter 5 passes the air discharge inserted piping O21 as the discharged gas, and therefore, hydrogen of a concentration above an appropriate concentration (an allowable range) is exhausted out of the vehicle.

Afterwards, as the time elapses, the discharged hydrogen which had been introduced to the diluter 5 from the opened hydrogen purge valve 6 is expelled from the diluter 5 as shown in FIG. 2, and thus the discharged hydrogen concentration in the diluter 5, as well as the required air amount, reduces over time. At a certain time point (a time t3 in FIG. 3), the required air-flow rate for diluting the discharged hydrogen to an appropriate concentration becomes lower than the normal air-flow rate.

In the above-mentioned process, between the time t2 and the time t3 after opening of the hydrogen purge valve 6 during the hydrogen purge control, the required air amount in accordance with the discharged hydrogen concentration in the diluter 5 exceeds the normal air-flow rate in the air discharge inserted piping O21, in the case where oxygen is supplied based on the electric generation (e.g., supplied in an amount proportional to the oxygen amount required for electric generation). As a result, hydrogen having an appropriate concentration or more, i.e., hydrogen in an amount above an allowable range, is exhausted out of the vehicle.

In this manner, because of the differences in the air-flow rate and the hydrogen discharge amount resulting from the changes in the load level of the fuel cell 2, when the load of high level is reduced to become low immediately after purging, an amount of the discharged air from the fuel cell 2 for diluting hydrogen decreases in a short period of time, relative to the time for diluting the highly-concentrated hydrogen from the fuel cell system 1 and completing the exhaust. Therefore, it is expected that highly-concentrated hydrogen is exhausted with diluted less, due to this time lag.

Accordingly in the present embodiment, a certain discharged air-flow rate is secured for diluting the discharged hydrogen to a concentration in an allowable range, and a hydrogen concentration of gas discharged from the fuel cell system 1 is retained in the allowable range, to thereby prevent hydrogen above the appropriate concentration being discharged.

<<Control of Flow Rate of Dilution Air for Diluting Discharged Hydrogen>>

Figure 4:
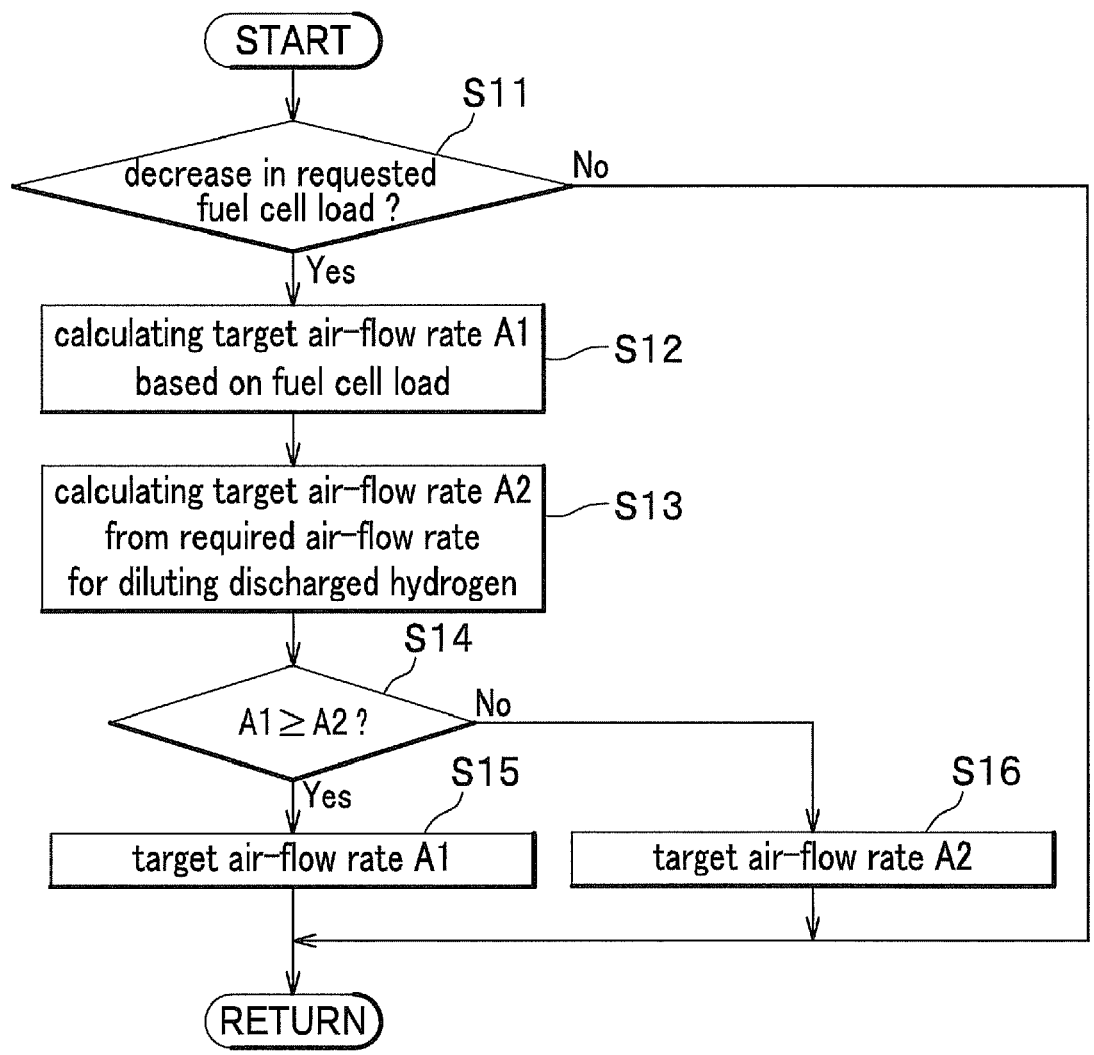
FIG. 4 is a flow chart showing a control of a dilution air-flow rate according to an embodiment of the present invention.

Next, a control of a flow rate of dilution air for diluting the discharged hydrogen will be described with reference to FIG. 4. FIG. 4 is a flow chart showing a control of a dilution air-flow rate.

The control of dilution air-flow rate is performed by executing a control program in the controller 10, outputting control signals or the like from the controller 10 to various devices in the fuel cell system 1 and at the same time, inputting signals from the various devices to the controller 10.

In the present control, a comparison is made between: a normal amount of air discharged from the fuel cell 2 when an air amount determined based on the load of the fuel cell 2 (e.g., an air amount which is proportional to an air amount to be used for the electricity generation) is constantly supplied to the fuel cell 2; and an air amount required for diluting hydrogen in the diluter 5 to an appropriate concentration in an allowable range and for discharging the diluted hydrogen out of the vehicle. The larger amount of the discharged air is used for diluting hydrogen, to thereby control the hydrogen concentration in the exhaust gas to an appropriate value, satisfying the requirement for the hydrogen concentration in the exhaust gas.

With referring to FIG. 4, the control of the dilution air-flow rate will be described.

At a step S11 in FIG. 4, the controller 10 determines whether or not there is a decrease in request of the load of the fuel cell 2 (for example, in the case where a driver suddenly reduces a pressure on an accelerator (pedal)). It should be noted that the step S11 can be omitted. When there is a decrease in the request load of fuel cell 2, at a step S12 of FIG. 4, the controller 10 calculates a target air-flow rate A1 in accordance with the load of the fuel cell 2. The expression "target air-flow rate A1" means an air amount as described below.

Specifically, as shown in FIG. 1, based on the load of the fuel cell 2, air in an amount, for example, proportional to the amount of air required for electric generation, is supplied from the compressor C to the cathode electrode 2c of the fuel cell 2 through the air supply piping O1, to thereby generate electricity. The amount of air supplied to the fuel cell 2 is referred to as "target air-flow rate A1". After the air with the target air-flow rate A1 is supplied to the fuel cell 2 and used for the electric generation, a portion of the air which is not used for the electric generation flows the air discharge piping O2, then flows through the air discharge inserted piping O21 in the diluter 5, sucks the diluted discharged hydrogen from the hydrogen outlet O2a to thereby further dilute the discharged hydrogen, and is exhausted out of the vehicle from the air discharge inserted piping O21. The normal air-flow rate is an amount of air flowing the air discharge inserted piping O21 in the diluter 5, in the above-mentioned case.

Figure 5:
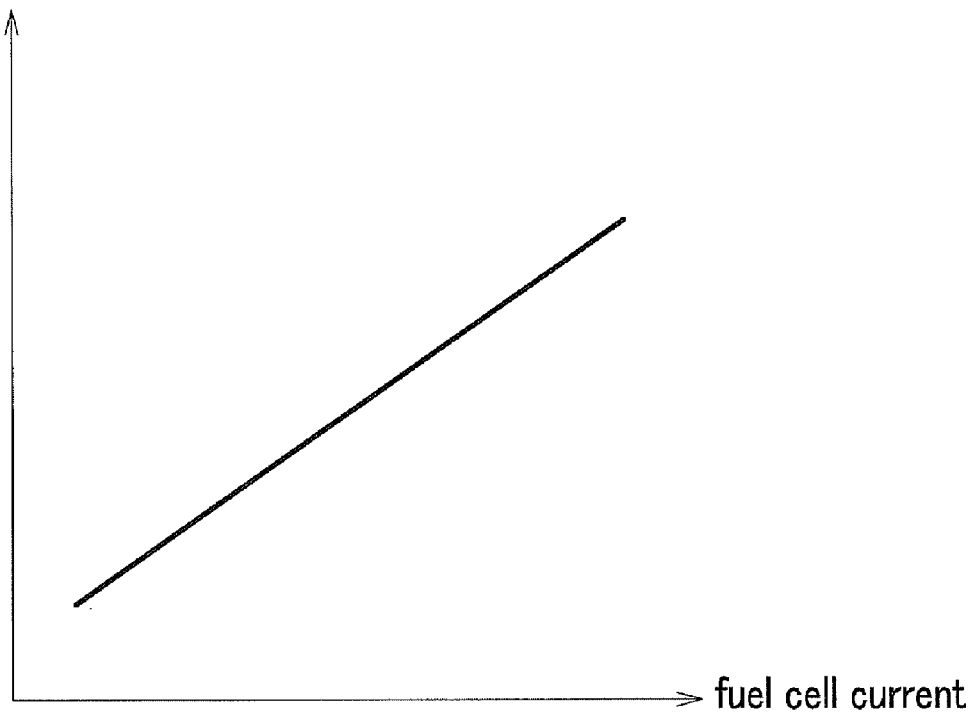
FIG. 5 is a graph showing target air-flow rate relative to current in a fuel cell, according to an embodiment of the present invention.

As shown in FIG. 5, the target air-flow rate A1 increases as the current of the fuel cell 2 increases. It should be noted that FIG. 5 is a graph showing target air-flow rate A1 relative to current in the fuel cell 2, in which the abscissa shows the current of the fuel cell 2 and the ordinate shows the target air-flow rate A1.

Figure 6:
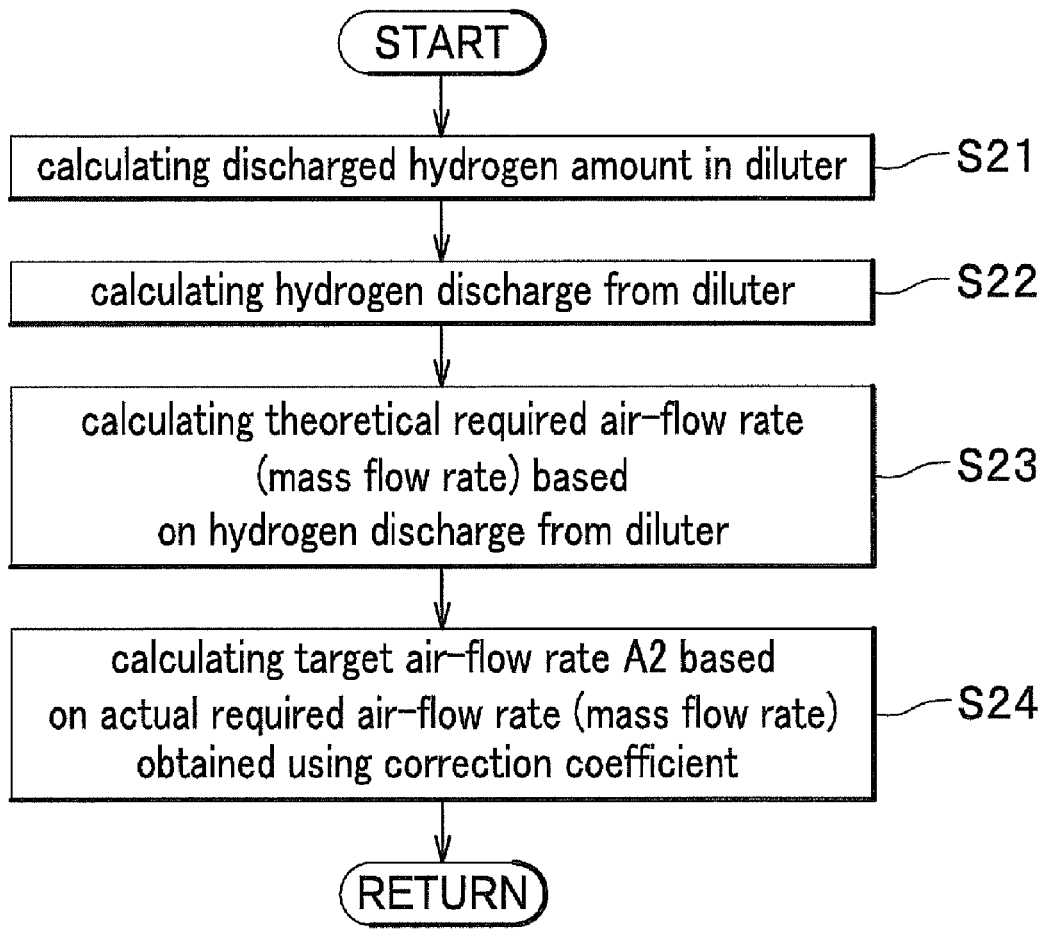
FIG. 6 is a flow chart showing a calculation of a target air-flow rate A2 from required air-flow rate according to an embodiment of the present invention.

Next at a step S13 in FIG. 4, the controller 10 calculates a target air-flow rate A2 from the required air-flow rate (see FIG. 6). It should be noted that FIG. 6 is a flow chart showing a calculation of the target air-flow rate A2 from the required air-flow rate. Hereinbelow, with referring to FIG. 6, the calculation of the target air-flow rate A2 from the required air-flow rate which is performed at the step S13 in FIG. 4 will be described.

At a step S21 in FIG. 6, there is calculated a discharged hydrogen amount in the diluter 5 discharged by the opening of the hydrogen purge valve 6 during the operation of the fuel cell 2.

For example, a map of the amount per unit time of the discharged hydrogen, which is empirically obtained in advance based on a pressure difference between an upstream side and a downstream side of the hydrogen purge valve 6 at a specific temperature, is stored in the memory unit of the controller 10. A pressure of the upstream side of the hydrogen purge valve 6 is measured by a pressure sensor disposed on piping near the anode electrode 2b of the fuel cell 2, which is on the upstream side of the hydrogen purge valve 6, while a pressure of the downstream side of the hydrogen purge valve 6 is measured by a pressure sensor disposed on piping on the downstream side of the hydrogen purge valve 6. A temperature is measured by a temperature sensor disposed on the circulation piping J provided at an outlet of the fuel cell 2.

At the controller 10, based on these pressure values measured during the hydrogen purge control, an amount per unit time of the discharged hydrogen is obtained from the map. The amount per unit time is multiplied by an opening period of the hydrogen purge valve 6, to thereby calculate the amount of hydrogen discharged into the diluter 5 by the hydrogen purge control. Alternatively, the amount of hydrogen discharged into the diluter by the hydrogen purge control may be set as a map in advance based on empirical measurements under various conditions including generation states of the fuel cell 2 relative to time, which map is stored in the memory unit of the controller 10, and may be estimated in the controller 10, based on the opening time of the hydrogen purge valve 6, with referring to the set map.

As described above, the amount of the discharged hydrogen may be obtained by cumulating (integrating) the amount per unit time of the discharged hydrogen calculated from pressure, temperature and the like, or alternatively, obtained by simply setting the value in advance based on the load of the fuel cell 2 during a hydrogen purge control. It should be noted that piping delay of the discharged hydrogen from the hydrogen purge valve 6 being expelled from the diluter 5 is taken into consideration upon calculation.

In addition, the amount of hydrogen in the diluter may be estimated based on the remaining amount of a discharged air-flow rate integrated value, if the discharged air-flow rate integrated value required for dilution in accordance with the hydrogen purge amount is set in advance.

Next, at a step S22 in FIG. 6, based on the amount of the discharged hydrogen in the diluter 5 calculated at the step S21 in FIG. 6 and, as shown in FIG. 2, an amount of the introduced air sent to the diluter 5 through the bypass piping B1, an amount per unit time of the discharged hydrogen to be expelled from the hydrogen outlet O2a of the diluter 5 is calculated. It should be noted that the amount of the introduced air can be obtained based on a revolving speed of the compressor C, a diameter of piping branched at the branched piping B0 and the like.

Next, at a step S23 in FIG. 6, based on the amount per unit time of the discharged hydrogen to be expelled from the hydrogen outlet O2a of the diluter 5 calculated at the step S22 in FIG. 6, a required air-flow rate as a theoretical mass flow rate in the air discharge inserted piping O21 shown in FIG. 2 is calculated in such a manner that the hydrogen concentration or hydrogen amount which is appropriate for exhaustion and set in advance can be obtained.

Figure 7:
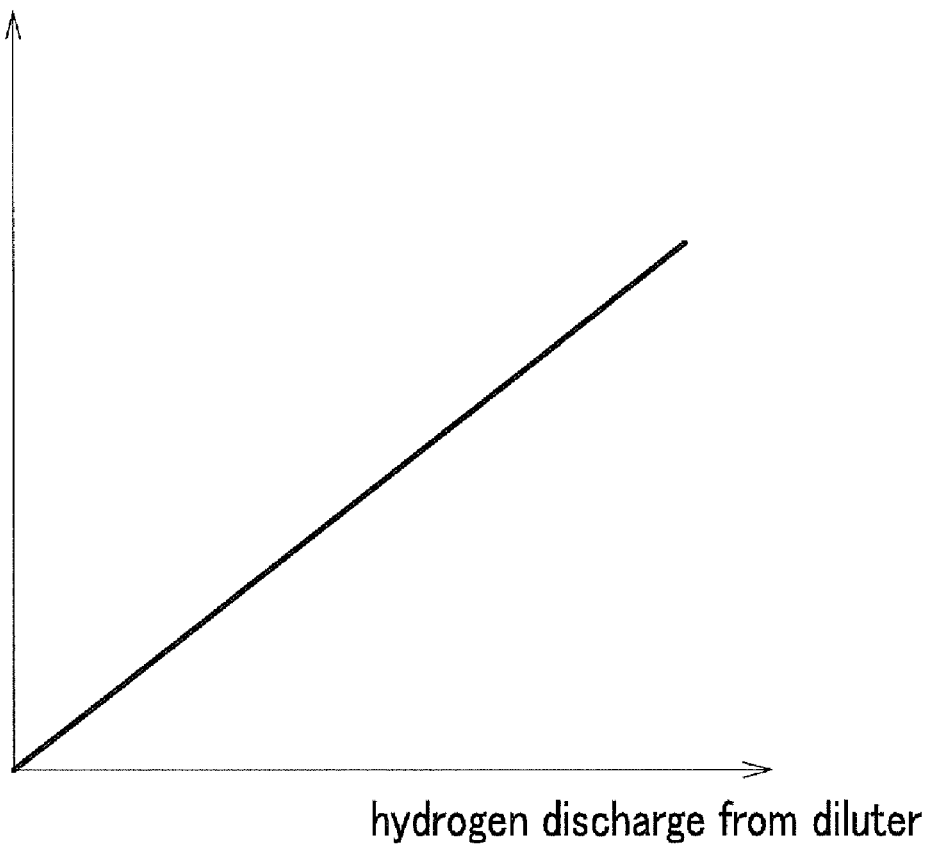
FIG. 7 is a graph showing a relationship between amount of the discharged hydrogen to be expelled from a diluter and required air-flow rate according to an embodiment of the present invention.

FIG. 7 is a graph showing a relationship between the amount of the discharged hydrogen to be expelled from the diluter 5 and the required air-flow rate as mass flow rate, in which the abscissa shows the amount of the discharged hydrogen to be expelled from the diluter 5 and the ordinate shows the required air-flow rate.

As shown in FIG. 7, in order to obtain a hydrogen concentration appropriate for exhaustion, a relationship is required in which, as the amount of the discharged hydrogen to be expelled from the diluter 5 increases, the required air-flow rate increases.

Subsequently, at a step S24 in FIG. 6, the theoretical required air-flow rate calculated at the step S23 is multiplied by a correction coefficient based on, such as temperature of the discharged air, of which the required air-flow rate is obtained, passing the air discharge inserted piping O21 shown in FIG. 2, pressure of the hydrogen outlet O2a shown in FIG. 2, and atmospheric pressure, to thereby calculate the required air-flow rate as the actual mass flow rate.

It should be noted that, the correction coefficient is empirically set in advance, so as to become larger, as the temperature of the discharged air, of which the required air-flow rate is obtained, passing the air discharge inserted piping O21 shown in FIG. 2 (i.e., temperature of the discharged gas) becomes higher, as the difference between the pressure at the hydrogen outlet O2a and the atmospheric pressure becomes larger, and as the atmospheric pressure becomes smaller.

It should be noted that, the temperature of the discharged air passing the air discharge inserted piping O21 shown in FIG. 2 is obtained by a temperature sensor provided near the outlet of the cathode electrode 2c of the fuel cell 2, and the pressure at the hydrogen outlet O2a shown in FIG. 2 is obtained based on a pressure measured by a pressure sensor disposed on the circulation piping J near the outlet of the anode electrode 2b of the fuel cell 2 and an atmospheric pressure.

The amount of air to be supplied to the fuel cell 2 which attains the required flow rate of the air, as a discharged gas, passing the air discharge inserted piping O21 shown in FIG. 2, is set as the target air-flow rate A2. For obtaining the target air-flow rate A2 from the required air-flow rate, theoretical and empirical data or the like is used in the controller 10.

These are the flow of calculating the target air-flow rate A2 from the required air-flow rate shown in FIG. 6, i.e., the target air-flow rate A2 at the step S13 in FIG. 4.

Next, the procedure advances to a step S14 in FIG. 4. At the step S14 in FIG. 4, the controller 10 makes a comparison between the target air-flow rate A1, which is calculated at the step S12 in FIG. 4 in accordance with the normal air-flow rate of the discharged gas, and the target air-flow rate A2 to be supplied to the fuel cell 2, which is calculated from the discharged hydrogen concentration at the step S13 in FIG. 4, in accordance with the required air-flow rate of the discharged gas as an amount of the discharged hydrogen in an allowable range.

When the target air-flow rate A1 is larger than the target air-flow rate A2 from the required air-flow rate corresponding to the discharged hydrogen concentration (Yes at the step S14), at a step S15 in FIG. 4, the target air-flow rate A1 is set as an amount of air to be supplied to the fuel cell 2. On the other hand, when the target air-flow rate A2 from the required air-flow rate corresponding to the discharged hydrogen concentration is larger than the target air-flow rate A1 (No at the step S14), at a step S16 in FIG. 4, the target air-flow rate A2 is set as an amount of air to be supplied to the fuel cell 2. In this manner, the larger value is selected from between the target air-flow rate A1 of the discharged gas during a normal operation and the target air-flow rate A2 of the discharged gas as required air-flow rate for dilution, and used as an amount of air to be supplied to the fuel cell 2.

These are the control of dilution air-flow rate for diluting the discharged hydrogen, and the operation of the compressor C is controlled by the controller 10 in such a manner that the thus set target air-flow rate A1 or A2 is supplied to the fuel cell 2.

<<Control of Hydrogen Purge>>

Figure 8:
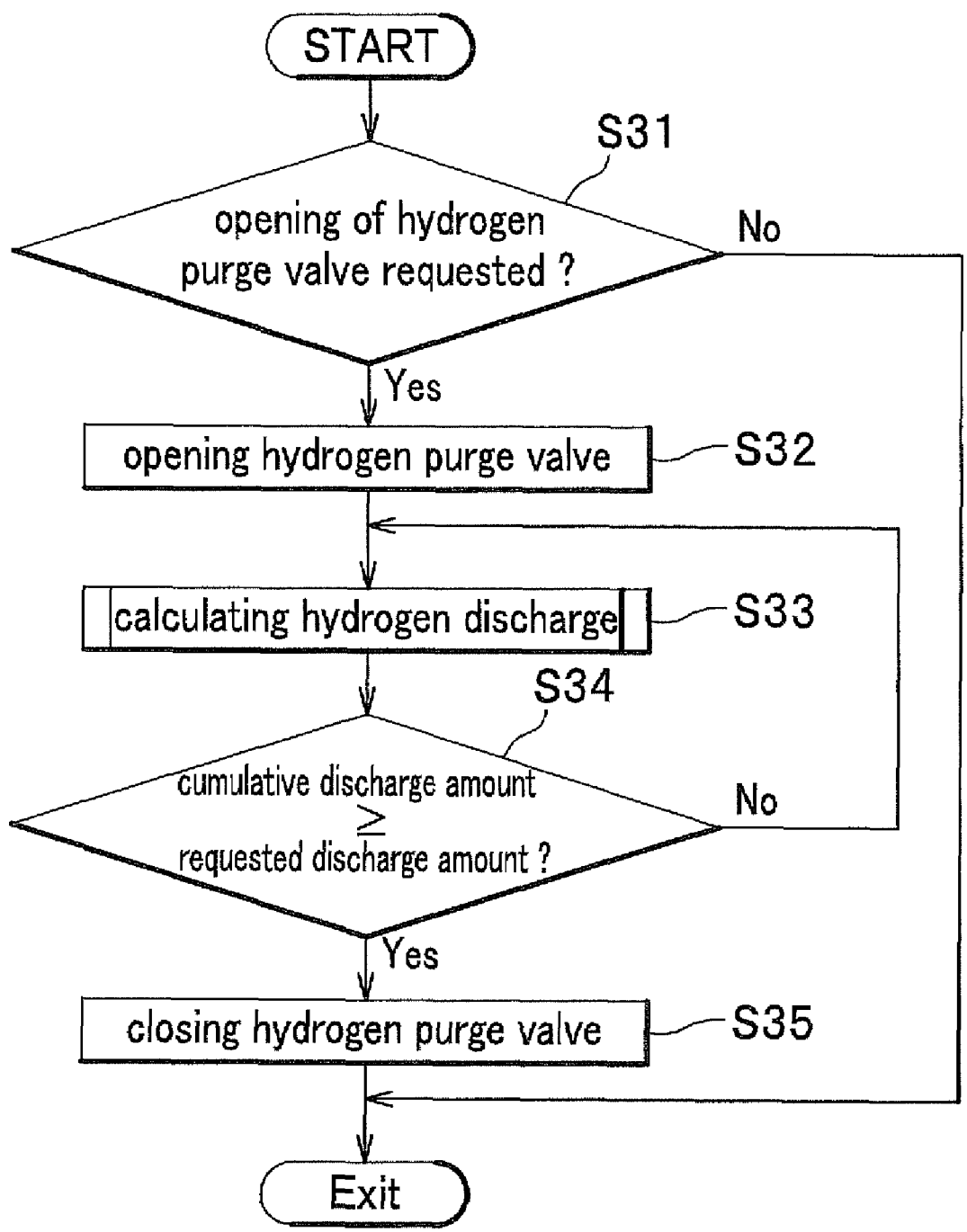
FIG. 8 is a flow chart showing a control of hydrogen purge according to an embodiment of the present invention.
Figure 9A:
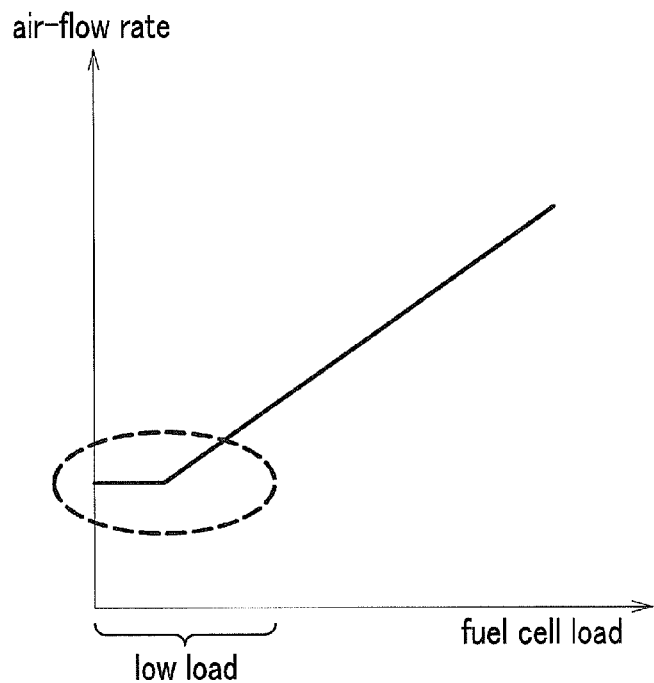
FIG. 9A is a graph showing a relationship between load and air-flow rate in a conventional fuel cell.
Figure 9B:
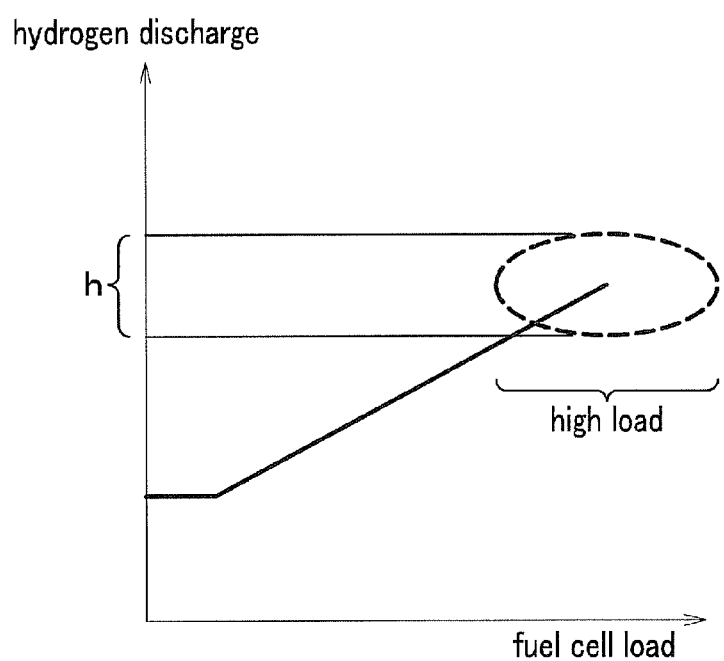
FIG. 9B is a graph showing a relationship between load and amount of the discharged hydrogen in a conventional fuel cell.
Figure 10:
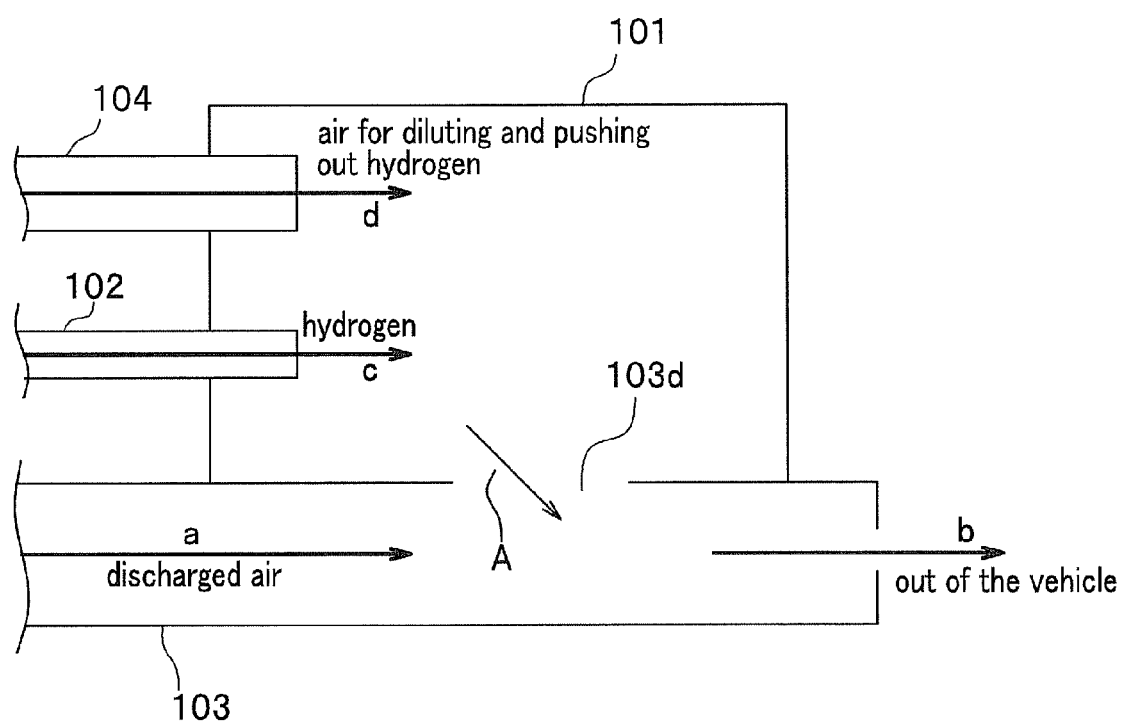
FIG. 10 is a schematic cross section showing a configuration of a conventional diluter and vicinities thereof.

Next, a control of hydrogen purge will be described with reference to FIG. 8. FIG. 8 is a flow chart showing a control of hydrogen purge.

The control of hydrogen purge is performed by executing a control program stored in the controller 10, outputting control signals or the like from the controller 10 to various devices, such as the hydrogen purge valve 6, in the fuel cell system 1 and at the same time, inputting signals from the various devices in the fuel cell system 1 to the controller 10.

At a step S31 in FIG. 8, the controller 10 determines whether or not there is a request for opening the hydrogen purge valve 6. When there is no request for opening the hydrogen purge valve 6 (No at the step S31), the control of hydrogen purge is not performed. On the other hand, when there is a request for opening the hydrogen purge valve 6 (Yes at the step S31), a control signal of the controller 10 is sent, and the hydrogen purge valve 6 is opened at a step S32 in FIG. 8. Subsequently, at a step S33 in FIG. 8, an amount of the discharged hydrogen due to the opening of the hydrogen purge valve 6 is calculated. The calculation is performed in substantially the same manner as described regarding the step S21 in FIG. 6, details of which are as follows.

For example, a map of the amount per unit time of the discharged hydrogen, which is empirically obtained in advance based on a pressure difference between an upstream side and a downstream side of the hydrogen purge valve 6 at a specific temperature, is stored in the memory unit of the controller 10. A pressure of the upstream side of the hydrogen purge valve 6 is measured by a pressure sensor disposed on piping near the anode electrode 2b of the fuel cell 2, which is on the upstream side of the hydrogen purge valve 6, while a pressure of the downstream side of the hydrogen purge valve 6 is measured by a pressure sensor disposed on piping on the downstream side of the hydrogen purge valve 6. A temperature is measured by a temperature sensor disposed on the circulation piping J provided at an outlet of the fuel cell 2.

At the controller 10, based on these pressure values measured during the hydrogen purge control, an amount per unit time of the discharged hydrogen is obtained from the map. The amount per unit time is multiplied by an opening period of the hydrogen purge valve 6, to thereby calculate the amount of hydrogen discharged into the diluter 5 by the hydrogen purge control. Alternatively, the amount of hydrogen discharged into the diluter by the hydrogen purge control may be set as a map in advance based on empirical measurements under various conditions including generation states of the fuel cell 2 relative to time, which map is stored in the memory unit of the controller 10, and may be estimated in the controller 10, based on the opening time of the hydrogen purge valve 6, with referring to the set map.

Subsequently, at a step S34 of FIG. 8, the controller 10 determines whether or not the cumulative discharge amount obtained by the opening of the hydrogen purge valve 6 is equal to or more than a specific requested hydrogen discharge amount calculated in advance by experiment or the like. When the cumulative discharge amount due to the opening of the hydrogen purge valve 6 is equal to or more than the specific requested discharge amount (Yes at the step S34), the hydrogen purge valve 6 is closed at a step S35 in FIG. 8. On the other hand, when the cumulative discharge amount by the opening of the hydrogen purge valve 6 is less than the specific requested discharge amount (No at the step S34), the procedure advances to the step S33 of FIG. 8. These are the hydrogen purge control.

According to the configurations described above, a certain air-flow rate is secured at any time required for diluting hydrogen to thereby suppress an increase in the hydrogen amount above the allowable range.

In addition, by pushing out the gas in the diluter, the dilution of hydrogen can be performed in a short period of time. Moreover, by determining the amount of air for diluting hydrogen based on the amount of air for pushing out hydrogen, it becomes possible to surely dilute hydrogen in accordance with the amount of hydrogen pushed out.

Further, by calculating the amount of air required for diluting hydrogen based on the amount of the residual hydrogen, it becomes possible to surely dilute hydrogen only when dilution of hydrogen is required.

Furthermore, even when the load of the fuel cell 2 decreases immediately after the hydrogen purge under the fuel cell being high load and the discharged air-flow rate drops, it becomes possible to surely suppress the raise in the discharged hydrogen amount and retain the amount in the allowable range, by securing the discharged air-flow rate (discharged gas flow rate) required for diluting the discharged hydrogen.

It becomes also possible to prevent the raise in the hydrogen concentration by increasing the discharged air-flow rate (discharged gas flow rate), to thereby improve the hydrogen purge efficiency and to downsize the diluter 5.

What is claimed is:

1. A method for controlling air-flow rate in a fuel cell system comprising:

an electricity generation step in which hydrogen and air are supplied to a fuel cell for allowing a chemical reaction between the supplied hydrogen and air to generate electricity;

a hydrogen dilution step in which hydrogen in a diluter discharged from the fuel cell is diluted with air discharged from the fuel cell;

a request load air amount calculation step in which an amount of air required for generating electricity in the fuel cell which meets request load is calculated;

a dilution air amount calculation step in which an amount of air to be supplied to the fuel cell that provides an amount of discharged gas required for diluting hydrogen discharged from the fuel cell to a specific concentration is calculated; and an air supply step in which air is supplied to the fuel cell based on the request load of the fuel cell decreasing, the air supply step:

comparing the amount of air calculated in the request load air amount calculation step with the amount of air calculated in the dilution air amount calculation step, and selecting, as a result of the comparing, the larger of the amounts of air calculated in the request load air amount calculation step and the dilution air amount calculation step for supply to the fuel cell.

2. The method according to claim 1, further comprising an air introduction step in which air is introduced to the diluter to push out gas from the diluter, a combining step in which the air discharged from the fuel cell is combined with the gas pushed out from the diluter, wherein
in the dilution air amount calculation step, the amount of air required for dilution is calculated based on an amount of the introduced air.

3. The method according to claim 1, wherein
in the dilution air amount calculation step, the amount of air required for dilution is calculated based on an amount of residual hydrogen in the diluter.

4. The method of claim 1 wherein the dilution air amount calculation step comprises the steps of:
calculating a discharged hydrogen amount in the diluter discharged by an opening of a hydrogen purge valve during the operation of the fuel cell;
calculating an amount per unit time of the discharged hydrogen to be expelled from a hydrogen outlet of the diluter based on the calculated amount of the discharged hydrogen in the diluter and an amount of an introduced air sent to the diluter through a bypass piping;
calculating a required air flow rate as a theoretical mass flow rate in an air discharge inserted piping in such a manner that the hydrogen concentration or hydrogen amount which is appropriate for exhaustion and set in advance can be obtained based on the calculated amount per unit time of the discharged hydrogen; and
calculating a required air flow rate as an actual mass flow rate by multiplying the calculated required air flow rate by a correction coefficient.

* * * * *